Feb. 3, 1970         H. W. GEORGI          3,493,782
DISCRIMINATOR POSSESSING MULTIPLE LEVELS OF DISCRIMINATION
Filed Oct. 19, 1965
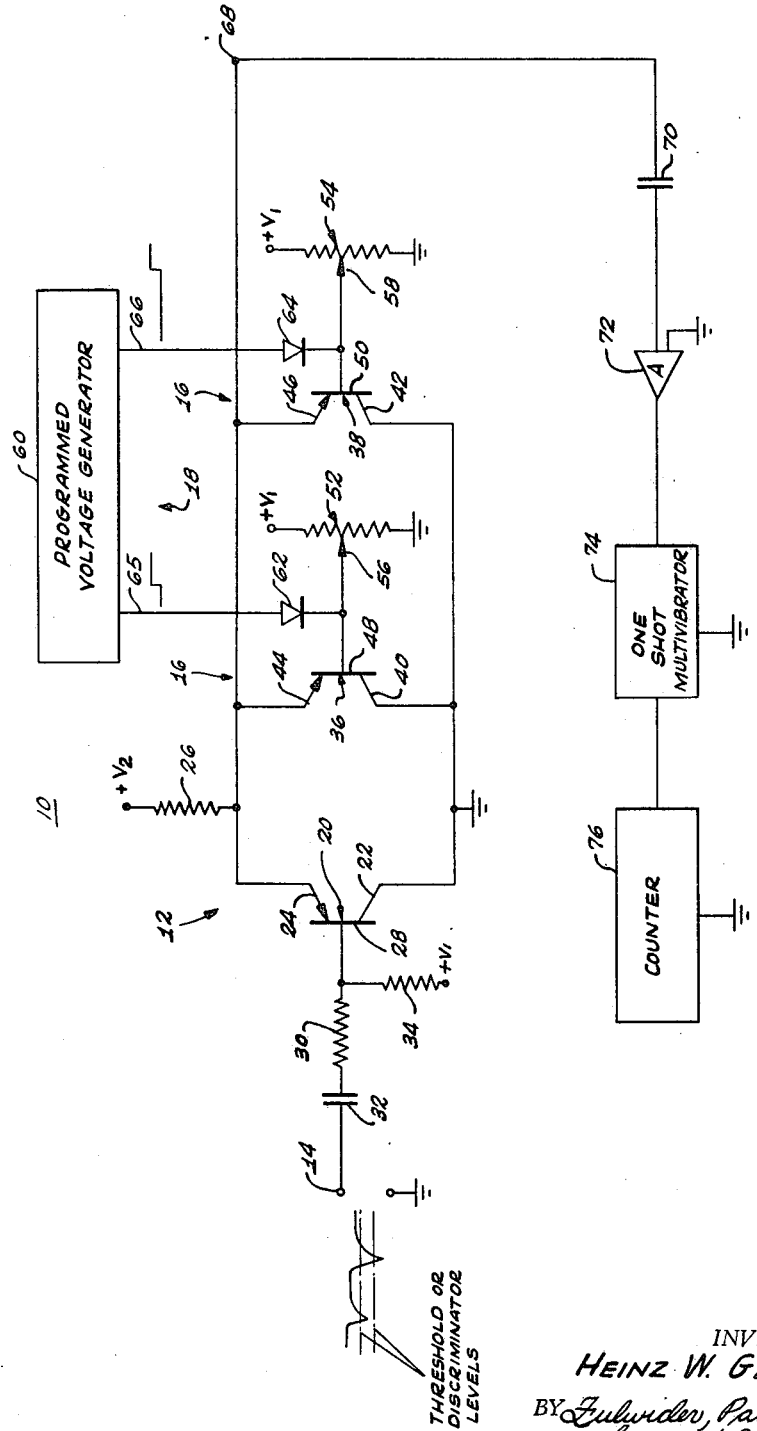
INVENTOR.
HEINZ W. GEORGI
BY Fulwider, Patton, Rieber,
Lee, and Utecht
ATTORNEYS

United States Patent Office 3,493,782
Patented Feb. 3, 1970

3,493,782
DISCRIMINATOR POSSESSING MULTIPLE LEVELS OF DISCRIMINATION
Heinz W. Georgi, San Diego, Calif., assignor to Beckman Instruments, Inc., a corporation of California
Filed Oct. 19, 1965, Ser. No. 497,902
Int. Cl. H03k 5/20
U.S. Cl. 307—235                    8 Claims

ABSTRACT OF THE DISCLOSURE

There is disclosed a discriminator having an input switching circuit normally biased, in the absence of an input signal, in a non-conductive condition. In parallel across the input circuit is a plurality of threshold establishing units for differently biasing the switching circuit at predetermined values such that the switching circuit is rendered conductive only by an input signal exceeding the preset value. A programmed voltage generator is connected to the threshold units and operates to render one of said units operative at a time. The threshold establishing units are provided with variable biasing means whereby the differing threshold levels set by each bias means may be varied. The output of the switching circuit is connected through a blocking capacitor and an amplifier to a one-shot multivibrator connected to a counter.

---

The present invention relates to signal discriminators, anad more particularly to a novel, discriminator for selectively presenting different levels of discrimination to input signals applied thereto.

In numerous electrical systems it is often desired to determine which, if any, signals in a series exceed a given magnitude and thereafter, or at some time in the transmission of the series, to determine which, if any, of the signals exceed a different magnitude. Generally this is accomplished by using two separate information channels, each employing a different discriminator circuit adapted to detect the presence of signals having magnitudes greater than different particular values. In use, the series of electrical signals is either applied in parallel to the two channels or a switching device is provided between the channels to switch the signals from one discriminator to another when it is desired to detect the presence of signals having a magnitude greater than a different value.

Unfortunately, the use of two separate channels to detect signals greater than different magnitudes represents a duplication of components which is costly, both from initial installation and service and maintenance standpoints.

Accordingly, it is a general object of the present invention to provide means whereby an information channel including a single discriminator circuit can detect signals having magnitudes above different predetermined levels in discrimination.

Another object of the present invention is to provide a discriminator circuit for presenting different predetermined and variable levels of discrimination to input signals applied thereto, and having means for automatically switching between the different discrimination levels when it is desired to detect the presence of signals having magnitudes greater than the different levels.

A further object of the present invention is to provide a discriminator circuit of the foregoing character which is rapid acting and reliable in its operation.

Still another object of the present invention is to provide a discriminator circuit of the foregoing character which is simple in design and inexpensive to manufacture.

The foregoing as well as other objects and advantages of the present invention may be more clearly understood by reference to the following detailed description when taken with the drawing, the single figure of which represents a wiring diagram of one form of discriminator circuit embodying the features of the present invention.

In the drawing, the discriminating circuit is represented by the numeral 10 and generally speaking includes a normally open or nonconductive switch device 12 having an input terminal 14 for receiving the electrical signals to be detected. Connected to the switch device 12 are a plurality of theshold establishing units 16, each providing a different signal input thesholf of operation or conduction for the switch device. A control unit 18 is connected to and controls the threshold establishing units 16 such that the threshold units operate with the switch device 12 one at a time and in controllable sequence. In this manner, the dscriminator circuit 10 presents different predetermined discrimination levels to the input signals—the switch device 12 becoming conductive to provide an output signal only when the signal input switch device exceeds the magnitude of the threshold of conduction established by the operating threshold unit.

More particularly, the switch 12 and plurality of threshold establishing units 16 preferably combine to form a difference amplifier circuit including the switch device as the first or input stage and the plurality of threshold establishing units as the parallel connected second or output stages.

In the illustrated form, the switch device 12 comprises a PNP-type transistor 20. The transistor 20 is arranged in a common-collector, emitter-follower configuration with its collector 22 connected to a reference ground and its emitter 24 connected through a resistor 26 to a relatively large positive voltage source, $V_2$. The resistor 26 and the voltage source $V_2$ comprise a bias source for the discriminator 10. The base 28 of the transistor 20 is connected to the input terminal 14 through a series circuit comprising a resistor 30 and a blocking capacitor 32, and is also connected to a relatively small positive voltage source, $V_1$, through a biasing resistor 34.

In the absence of an input signal at the terminal 14, the bias at the emitter 24 maintains the base 28 of the transistor 20 slightly positive relative to the emitter 24 and the transistor in a nonconductive state. In this condition, the transistor 20 only becomes conductive when an input signal applied to the input terminal 14 combines with $V_1$ to drive the base 28 to a potential equal to or slightly negative relative to the potential at the emitter 24, the emitter potential being the threshold level of conduction established by the operating threshold unit 14 and the magnitude of the input signal required to drive the transistor 20 into conduction being the discrimination level established by the operating threshold unit, i.e., $-e_{in}=V_e-V_1$.

In the illustrated form of the discriminator 10, the threshold establishing units 16 comprise PNP-type transistors 36 and 38. The transistors 36 and 38 are arranged in a common-collector, emitter-follower configuration with collectors 40 and 42 connected to the reference ground and emitters 44 and 46 connected in common through the resistor 26 to the positive voltage source $V_2$. In this manner, the transistors 36 and 38 are connected to the transistor 20 and parallel with each other.

The bases 48 and 50 for the transistors 36 and 38 are connected to similar adjustable bias units, here comprising potentiometers 52 and 54 connected between the positive voltage source $V_1$ and the reference ground. The bases 48 and 50 are connected to movable contacts 56 and 58 of the potentiometers 52 and 54 such that the voltages applied to the bases may be controlled and are always less than the D-C base voltage of the transistor 20, namely $V_1$.

The bias for the transistors 36 and 38 provided by the potentiometers 52 and 54, the resistor 26 and voltage sources $V_1$ and $V_2$ is such that the transistors 36 and 38 normally are conducting.

As previously discussed, however, the threshold establishing units 16 are controlled by the control unit 18 such that the units operate with the switch device 12 one at a time and in a controllable sequence. To accomplish this, the control unit 18 preferably includes a programmed voltage generator 60 and a pair of diodes 62 and 64. The cathodes of the diodes 62 and 64 are connected to the bases 48 and 50, respectively, while the anodes of the diodes are connected to output terminals 65 and 66 of the voltage generator 60.

The programmed voltage generator 60 may be any conventional circuitry or system for selectively generating positive D-C voltages at the output terminals 65 and 66 and may be preset to generate the D-C voltages at predetermined times for predetermined time intervals, or may be automatically controlled by other circuitry. Preferably, the voltage generator 60 is arranged to produce a positive D-C voltage at either output terminal 65 or 66 sufficient to forward bias the diode connected thereto while producing a voltage at the other output terminal which back-biases the diode connected thereto. When the diode 62 is forward biased, a positive voltage is applied directly to the base 48 of the transistor 36 causing the transistor 36 to be back-biased and immediately switch to a nonconductive state. The same operation occurs for the transistor 38 when the diode 64 is forward biased. In this manner, the control unit 18 may be operated to selectively control the threshold establishing units 16 to operate at different times as it is desired to shift the discrimination levels presented by the discriminator circuit 10.

In this regard, the potentiometers 52 and 54 are set such that different voltages appear at the bases 48 and 50 of the transistors 36 and 38. Since the transistors 36 and 38 are arranged in emitter follower configurations, the different base voltages also appear at the emitter 24 of the transistor 20 to establish different discrimination levels for the discriminator circuit 10.

In particular, before the transistor 20 will switch to a conductive state, the input signal applied to the input terminal 14 must combine with $V_1$ and bias the base 28 to a voltage equal to or negative relative to the emitter 24. That is, the base voltage must be more negative than threshold voltage established by the base of the conducting transistor 36 or 38 before the transistor 20 will become conductive.

When the transistor 20 switches to its conductive state, however, the emitter 24 follows the negative voltage at the base 28 to produce a negative output signal at an output 68 connected in common to the emitters 24, 44 and 46. The negative output signal passes through a blocking capacitor 70, is amplified by an amplifier 72 and applied to a one-shot multivibrator 74. The amplified negative signal triggers the one-shot multivibrator 74 to produce a sharp pulse signal which is applied to a counter 76 which registers the output signal by advancing one position in its count. In this manner, an indication is provided of the presence of an input signal greater than the then existing level of discrimination.

In addition to the generation of an output signal, as soon as the transistor 20 switches to its conductive state, the conducting transistor 36 or 38 immediately becomes nonconductive. In particular, if the transistor 36 is conducting to establish the discrimination level for the discriminator 10, when the transistor 20 becomes conductive, the emitter 24 follows the base 28 to a voltage which is negative relative to the base 48 of the transistor 36. Since the emitter voltage is applied directly to the emiter 44, this immediately causes the transistor 36 to be back biased and switch to a nonconductive state. At the termination of the input signal greater than the level of discrimination provided by the transistor 36, the transistor 36 automatically returns to its conductive state and the transistor 20 again becomes nonconductive. A similar operation occurs at the transistor 38 when it is conducting and the transistor 20 switches to a conductive state in response to an input signal greater than the level of discrimination established by the transistor 38.

By way of summary, if the transistor 36 is conducting to establish a particular threshold of conduction for the transistor 20 and a level of discrimination for the discriminator 10, then the diode 62 is back biased, the diode 64 forward biased, and the transistor 38 nonconducting. Under such conditions, the base potential developed by the potentiometer 52 establishes the particular threshold of conduction and discrimination level. The operation of the transistors 20 and 36 in response to an input signal having a magnitude greater than the level of discrimination is as just previously described.

When it is desired to detect the presence of input signals having a magnitude greater than a different level of discrimination, the voltage generator 60 develops D-C voltages at the output terminals 65 and 66 which forward bias the diode 62 and back bias the diode 64. As this occurs, the transistor 36 becomes nonconductive and the transistor 38 conductive. Under such conditions, the base potential developed by the potentiometer 54 establishes the threshold of conduction for the transistor 20 and the level of discrimination for the discriminator 10— which are different than those established by the conducting transistor 36. When the magnitude of an input signal exceeds the new level of discrimination, the transistors 20 and 38 operate in the same manner as that previously described for the transistors 20 and 38 to provide an indication of the presence of the input signal.

Accordingly, it is appreciated that the present invention provides means whereby an information channel utilizing a single discriminator can alternately detect signals having magnitudes above different predetermined levels of discrimination. This is accomplished by providing a discriminator circuit for presenting different predetermined and variable levels of discrimination to input signals applied thereto and by including means for automatically switching between the different discrimination levels. It is also appreciated that the operation of the discriminator circuit is rapid and reliable, and that the discriminator circuit is simple in design and, accordingly, inexpensive to manufacture.

While a particular form of discriminator circuit has been described in some detail herein, changes and modifications may occur to those skilled in the art without departing from the spirit of the present invention. For example, NPN-type transistors or tubes may be substituted for the PNP-type transistors with appropriate changes in the illustrated biasing and signal polarities. Also, the input stage may be normally conducting such that the discriminator operates as a conventional difference amplifier. In view of these, as well as other possible modifications in the illustrated discriminator circuit, it is intended that the present invention be limited in scope only by the terms of the following claims.

I claim:
1. A discriminator circuit for detecting the presence of an input signal having a magnitude greater than different predetermined values comprising:
   a switching circuit having an input for receiving the input signal to be detected and an output;
   biasing means biasing said switching circuit in a nonconductive state in the absence of an input signal;
   a plurality of threshold units connected to said switching circuit for differently biasing said switching circuit at predetermined values;
   control means connected to said threshold units for rendering one of said units to be operative at any time whereby said switching circuit is rendered conductive only by an input signal having a value greater than the predetermined value established by the respective threshold unit which is operative.

2. The discriminator of claim 1, wherein said switching circuit and said threshold units each comprises a transistor arranged in a common-collector, emitter-follower configuration, the emitter of each being connected to a common point and wherein said bias control means includes means for selectively back-biasing said transistors of said threshold units.

3. The discriminator of claim 2, wherein said control means includes diodes connected to the base terminals of each threshold unit transistor and selectively operable means for forward-biasing said diodes.

4. A discriminator comprising:
a normally nonconductive switching device having an input terminal and an output terminal;
threshold establishing means connected to said switching device for establishing a plurality of discrete voltage thresholds of conduction for said switching device;
and programmed control means connected to said threshold establishing means for selecting one of said plurality of discrete voltage thresholds.

5. A discriminator, comprising:
first, second and third transistors, each arranged in a common-collector, emitter-follower configuration with the emitter of each transistor connected to a common point, said first transistor being an input transistor for receiving input signals at its base terminal;
a current source connected to said common point;
first bias means connected to said base of said input transistor;
second bias means connected to the bases of said second and third transistors for differently biasing said bases of said transistors;
and bias control means connected to said bases of said second and third transistors for selectively back-biasing said transistors such that said transistors are conductive one at a time.

6. The discriminator of claim 5, wherein said first bias means biases said base of said input transistor to a given potential and wherein said second bias means biases said second and third transistors to different potentials than said given potential to present different levels of discrimination to said input signals.

7. The discriminator of claim 6 wherein said bias control means includes diodes connected to said bases of said second and third transistors, and selectively operable means for biasing said diodes.

8. The discriminator of claim 6 including output means connected to said common point for indicating the occurrence of an input signal having a magnitude greater than the level of discrimination established by the conductive second and third transistors.

References Cited

UNITED STATES PATENTS

| | | | |
|---|---|---|---|
| 3,181,008 | 4/1965 | Huckins | 307—235 |
| 3,248,567 | 4/1966 | Quinlan | 307—247 X |
| 3,297,883 | 1/1967 | Schulmeyer et al. | 307—269 X |
| 3,058,007 | 10/1962 | Lynch | 307—218 |
| 3,164,754 | 1/1965 | Garland et al. | 307—235 |

JOHN S. HEYMAN, Primary Examiner

J. D. FREW, Assistant Examiner

U.S. Cl. X.R.

307—289; 328—97, 115, 146, 150